US010018508B2

(12) United States Patent
Bohle et al.

(10) Patent No.: US 10,018,508 B2
(45) Date of Patent: Jul. 10, 2018

(54) OPTOMECHANICALLY COMPENSATED SPECTROMETER (71) Applicant: Spectro Analytical Instruments GmbH, Kleve (DE)

(72) Inventors: Wolfram Bohle, Kleve (DE); Alexander Morlang, Darmstadt (DE)

(73) Assignee: Spectro Analytical Instruments GmbH, Kleve (DE)

( * ) Notice: Subject to any disclaimer, the term of this patent is extended or adjusted under 35 U.S.C. 154(b) by 0 days.

(21) Appl. No.: 15/262,061

(22) Filed: Sep. 12, 2016

(65) Prior Publication Data
US 2017/0322077 A1    Nov. 9, 2017

(30) Foreign Application Priority Data
May 4, 2016 (DE) .......... 10 2016 005 386

(51) Int. Cl.
| G01J 3/28 | (2006.01) |
| G01J 3/02 | (2006.01) |
| G02B 7/18 | (2006.01) |
| G02B 7/182 | (2006.01) |
| G01J 3/443 | (2006.01) |
| G01J 3/18 | (2006.01) |

(52) U.S. Cl.
CPC ............. *G01J 3/021* (2013.01); *G01J 3/18* (2013.01); *G01J 3/443* (2013.01); *G02B 7/181* (2013.01); *G02B 7/1827* (2013.01)

(58) Field of Classification Search
CPC ...... G01J 3/443; G01J 3/18; G01J 3/20; G01J 3/0286; G01J 1/0204; G02B 7/181
See application file for complete search history.

(56) References Cited

U.S. PATENT DOCUMENTS

| 3,503,685 A * | 3/1970 | Driscoll .................... G01J 3/04 356/311 |
| 6,650,412 B1 * | 11/2003 | Slater ........................ G01J 3/02 356/328 |
| 6,862,092 B1 * | 3/2005 | Ibsen ........................ G01J 3/00 356/328 |
| 2007/0153352 A1 * | 7/2007 | Shibata ...................... G01J 3/02 359/237 |

* cited by examiner

Primary Examiner — Kara E Geisel
Assistant Examiner — Maurice Smith
(74) Attorney, Agent, or Firm — Panitch Schwarze Belisario & Nadel LLP (57) ABSTRACT

A spectrometer for examining the spectrum of an optical emission source may include: an optical base body, a light entry aperture connected to the optical base body to couple light into the spectrometer, at least one dispersion element to receive the light as a beam of rays and generate a spectrum, and at least one detector for measuring the generated spectrum. A light path may run from the light entry aperture to the detector. A mirror group with at least two mirrors may be provided in a section of the light path between the light entry aperture and the at least one detector, in which the beam does not run parallel, which may compensate for temperature effects. In the mirror group, at least one mirror or the entire mirror group may be moveable relative to the optical base body and may be coupled to a temperature-controlled drive.

12 Claims, 5 Drawing Sheets

Legend
Standard FWHM
Temperature (°C)
X 435.83 nm, without compensation
Δ 435.83 nm, linearly moved mirror group
O 435.83 nm, rotated mirror group

OPTOMECHANICALLY COMPENSATED SPECTROMETER

This application claims priority to German Application No. 10 2015 005 3860, filed May 4, 2016, the contents of which are incorporated by reference herein.

The invention relates to a spectrometer.

Spectrometers for examining the optical emission of radiation sources, like those used in optical emission spectral analysis (OES), serve for splitting up and examining the optical emission from a plasma, which is generated by excitation sources, such as for example arcs, sparks, ICP or LIBS. The measured spectrum enables the determination of the chemical composition of the sample excited in the plasma.

Such a spectrometer generally consists of an imaging system of optical elements on a base body with a light entry aperture, a diffraction grating as the dispersion element and at least one detector for measuring the spectrally split radiation as well as optionally additional optical elements such as screens, mirrors, lenses, beam splitters for beam shaping and beam guidance. The locations of sharp imaging of the entry aperture are designated for all wavelengths as the focal curve or focal plane in the spectrometer. Radiation of adjacent wavelengths are separated here as far as possible from each other, the spectral resolution reaches its maximum here. Spatial resolution array detectors are positioned at the focal curve in order to measure the spectrum in its entirety or exit slits are applied here in order to select the light of individual wavelengths and to supply it to a subsequent detector.

As an example, a spectrometer with a concave dispersion grating with a radius of curvature R and groove spacing d is viewed in a Paschen-Runge arrangement. The light entry aperture, generally a slit with less than 20 μm of width, is located in the dispersion plane of the grating, which, in addition to the dispersion, simultaneously functions as an imaging element and focuses the diffracted light. The beam path between the light entry aperture and the grating centre is designated as the front focal distance LE, the beam path from the grating centre to the focus position as the back focal distance LA of the viewed wavelength. In addition, the angle at which the radiation from the entrance slit impinges the grating is designated as the incidence angle $\alpha$ and the angle at which the radiation, diffracted in the order N, of the viewed wavelength $\lambda$ leaves the grating is designated as the diffraction angle $\beta$ of the viewed wavelength. The diffraction angle is, in this respect, determined by the grating equation:

$$n\lambda = d(\sin \alpha + \sin \beta) \quad \{Eq.\ 1\}$$

Eq. 1 also proves that a small change of the incidence angle $\Delta\alpha$ leads to changes of the diffraction angles of all wavelengths by the same angle value, but with an inverted sign: $\Delta\beta = -\Delta\alpha$.

The focal curve of the spectrometer emerges according to the imaging equation at the concave diffraction grating:

$$\cos^2\beta/LA + \cos^2\alpha/LE - \cos\alpha/R - \cos\beta/R = 0 \quad \{Eq.\ 2\}$$

as a curved line in the dispersion plane. In the case of $LE = R \cos\alpha$, the focal curve corresponds to a circle [Rowland circle: $LA = R \cos\beta$].

The change of the back focal distance $\Delta A$ can be derived from Eq. 2 for a small change of the front focal distance $\Delta E \ll LE$ by:

$$\Delta A = -\Delta E/[1+\delta(1+\cos\alpha/\cos\beta)]^2 \quad \{Eq.\ 3\}$$

$\delta$ herein describes the deviation of the front focal distance from the Rowland focus: $LE = R \cos\alpha(1+\delta)$.

The back focal distances constantly change with an inverted sign. The focal curve of the spectrometer thus shifts closer to the grating when the entrance slit is remote from the grating. Conversely, the focal curve moves away from the grating when the entrance slit approximates the grating.

In the case of the Rowland circle ($\delta = 0$), Eq. 3 is simplified as: $\Delta A = -\Delta E$. The change of the back focal distance is the same for all wavelengths and independent of the incidence angle $\alpha$. The amounts of change are no longer the same with deviation from the Rowland circle situation. An angle dependency also develops with increasing $\delta$, which can, however, usually be neglected in the case of the angles that are common in spectrometers.

Temperature changes caused by the thermal expansion coefficients of the materials used have a direct effect on the properties of the spectrometer. The distances of the entrance slit and detectors relative to the dispersion grating change by way of the thermal expansion of the optical base body, which is generally made from an aluminum alloy. In the case of a temperature increase, all distances become larger, in the case of a temperature decrease, all distances become smaller. In each case, a defocussing of the optical system occurs, since the exit back focal distances always change due to the imaging equation (Eq. 3) counter to the mechanical distances. Thus, focal curve and detectors are moved in opposite directions away from each other. The defocussing of the optical system directly results in the spectral resolution capacity of the spectrometer becoming worse.

A plurality of approaches are known from the prior art in order to maintain the spectral resolution of the spectrometer in the case of variable ambient temperature. These approaches are listed below:

1. Thermostatic stabilisation: the optical system is maintained at a constant temperature. Depending on the ambient temperature, it must be cooled or heated. This approach is popular and has been proven time and again, however it is energy-intensive and is disadvantageous in particular in the case of mobile devices which are powered by energy storage systems.
2. The optical base body is made from materials with a low thermal expansion coefficient. The defocussing of the spectrometer is thereby minor and the worsening of the spectral resolution is still tolerable. Such materials are for example Invar® or, as described in the patent DE 102011082468 B4, made from carbon fibre-reinforced plastic. The specifying of a few suitable materials, however, greatly limits the constructive design possibilities and also has a disadvantageous impact on the manufacturing costs.
3. In the patent application DE 102010000490 A1, the position of the entrance slit is mechanically changed along the direction of incidence of the radiation to compensate the temperature effect. To this end, the entrance slit is located on a compensation body, which is attached to the optical base body. In the case of a temperature change, the compensation body causes a movement of the entrance slit with respect to the optical base body, whereby the front focal distance changes. The compensation movement of the entrance slit is dimensioned such that the focal curve follows the displacement the detectors and defocussing of the optical system does not occur. This solution approach involves the entrance slit no longer being able to be fixedly integrated into the optical base body, but rather having to be moved relative to the same. The compensation movement of the entrance slit also has to be even stronger than the causal movement caused by the expansion of the optical base body. Only in this way can the required position correction of the focal curve be achieved, as emerges from the above-mentioned contexts of the optical image. An entrance slit, which changes its position in the base body in this way, is, however, disadvantageous with regard to the stability of the light input from the radiation source into the spectrometer. In this respect, it also changes the spatial position of the entrance slit with respect to the emission source. This situation is in particular disadvantageous if the radiation should only reach into the spectrometer from a small partial area of the emission source that is spatially sharply delimited.

It is therefore the object of the present invention to provide a spectrometer with a temperature compensation that works without thermostatic temperature stabilisation, in which an optical base body made of conventional materials can be used and in the case of which the spatial position of the entrance slit with respect to the emission source does not change due to the temperature compensation.

This object is achieved by a spectrometer with the features recited in the various claims.

Because in the case of a spectrometer for examining the spectrum of an optical emission source,
 with an optical base body,
 with a light entry aperture fixedly connected to the optical base body, which couples light from the emission source into the spectrometer,
 with at least one dispersion element which receives the light as a beam and generates a spectrum, and
 with at least one detector for measuring the generated spectrum,
wherein a light path runs from the light entry aperture to the detector, in a section of the light path between the light entry aperture and the at least one detector, in which the beam does not run parallel, a mirror group with at least two mirrors is provided, of which at least one mirror or the entire mirror group is arranged moveable relative to the optical base body and is coupled with a temperature-controlled drive, wherein the light path is led from the light entry aperture to the at least one detector via the mirror group, the maladjustment of the spectrometer can be compensated by the temperature-dependent movement of at least one mirror within the mirror group or the mirror group as a whole in the case of temperature changes by the light entry aperture being virtually displaced, while the light entry aperture remains fixed in position to the optical base body.

In this respect, the mirror group can be provided in a first section of the light path between the light entry aperture and the dispersion element, in which the beam runs in a divergent manner. This embodiment is in particular advantageous in the case of Paschen-Runge arrangements. Provision can, however, also be made for the mirror group to be arranged in a second section of the light path between the dispersion element and the at least one detector, in which the beam runs in a convergent manner. Thus for example in the case of Echelle arrangements, possible constructive limitations can be given consideration.

Advantages in the optical structure emerge when the mirror group consists of two plane mirrors, which are arranged at an angle to each other and form a reflector, which deflects the beam in the incident plane or the exit plane of the spectrometer. The incident plane, in the case of spectrometers with a concave dispersion grating, designates the plane, which is defined by the incoming light beam and the perpendicular to the grating centre. The exit plane of such a spectrometer is identical to the dispersion plane which is defined by the diffracted light beams of the different wavelengths. Incident and exit planes usually coincide in these spectrometers.

In this respect, it is preferred for the mirror group to comprise a symmetry axis and to be linearly displaced by the drive in a displacement direction in order to change the optical path length of the light path (front focal distance or back focal distance) which amounts to a virtual movement of the light entry aperture in the beam direction.

Depending on the structure and requirements of the spectrometer, the displacement direction in the incident plane can deviate from the direction of the symmetry axis of the mirror group and therefore a parallel offset of the beam reflected by the mirror group can occur in the case of the linear displacement of the mirror group simultaneously to the change of the front focal distance which amounts to a virtual movement of the entry opening in the beam direction and transverse to the beam direction or the displacement direction in the incident plane can be aligned in the direction of the symmetry axis.

Additionally or alternatively, provision can also be made for the mirror group to be rotated about an axis aligned vertically to the incident plane, wherein the position of the rotational axis is selected such that in the case of the rotation, both a desired change of the front or back focal distance and a desired parallel offset of the beam reflected by the mirror group is achieved which amounts to a virtual movement of the entry opening in the beam direction and transverse to the beam direction.

It may also be advantageous for the mirror group to be rotated about an axis perpendicular to the incident plane, wherein the position of the rotational axis is selected such that a desired change of the front or back focal distance is achieved, however, the parallel offset of the beam reflected by the mirror group is negligibly small, for example it is less than 10 µm transverse to the beam direction.

In a preferred embodiment, the drive of the mirror group relative to the optical base body comprises a thermobimetal. A drive of this type can be simply constructed and does not require any energy or electronic control system.

It is similarly preferred for the mirror group to be mounted on the optical base body in a linear bearing which is preferably designed as a roller bearing.

The thermobimetal can be designed in a strip shape and be fixed with a first end in a heat-conducting manner to the optical base body. This ensures that the drive of the mirror group can follow the temperature profile of the optical base body particularly well.

A reliable and play-free connection of the thermobimetal to the mirror group is achieved when the thermobimetal is mounted with the second end thereof in a floating manner on the mirror group.

Alternatively, pivot bearings can also be provided instead of linear bearings if a rotational movement of the mirror group is preferred. The same then applies for the drive of the mirror group.

Exemplary embodiments of the present invention are described below by means of the drawing.

Figure 1:
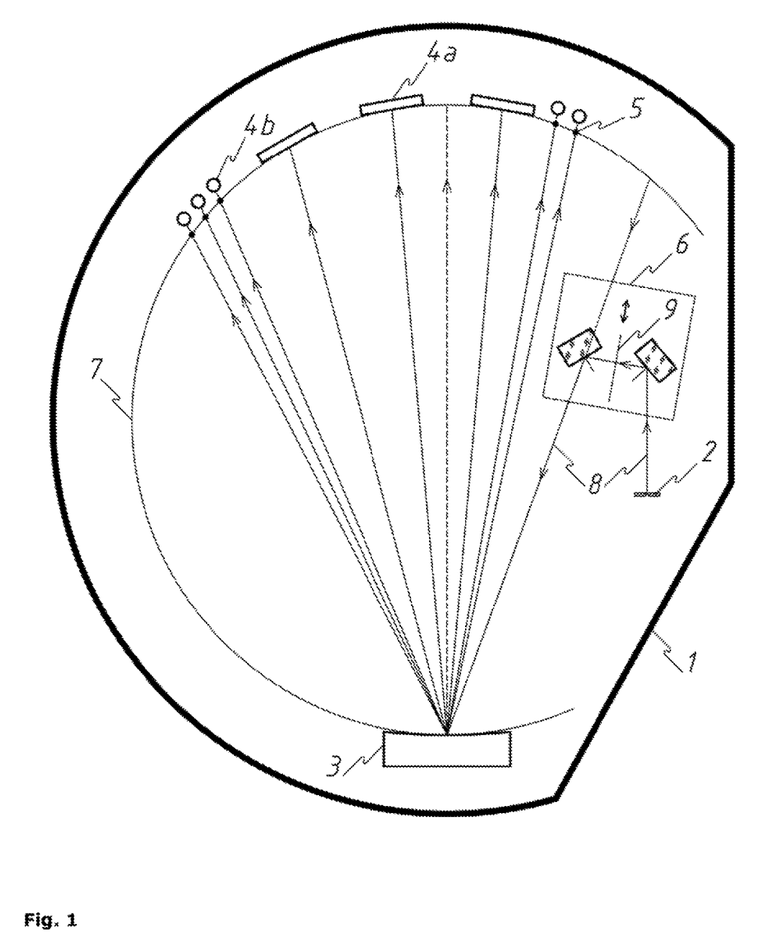
FIG. 1: shows a Paschen-Runge spectrometer in a Rowland circle arrangement in a schematic depiction in a plan view of the incident and exit plane.

The present invention pursues the novel approach, as shown in FIG. 1 as an example of a Paschen-Runge spectrometer in a Rowland circle arrangement in the case of compensation of the defocussing due to the thermal expansion of the optical base body. The light entry aperture is depicted as an entrance slit 2. The latter as well as the concave diffraction grating 3, array detectors 4a, exit silts 5 with downstream detectors 4b are arranged on the Rowland circle 7 and are fixedly connected to the optical base body 1. The light path within the spectrometer thus runs from the light entry aperture to the detectors. Different optical elements are arranged within this light path. The temperature-dependent position of the elements to each other is determined only by the thermal expansion movement of the optical base body. In order to avoid the defocussing of the spectrometer, the position of the entrance slit is not actually displaced, but rather merely virtually displaced. To this end, the light beam 8 is guided on the path thereof from the entrance slit 2 to the grating 3 via a mirror group 6 movable relative to the optical base body 1. The mirror group consists of two plane mirrors which are arranged at an angle to each other and form a reflector which deflects the beam 8 within the incident plane. If the mirror group in the incident plane is moved along the symmetry axis thereof 9, which is determined by the angle bisector between the two mirrors, then the front focal distance changes, i.e. the optical path length between the entrance slit 2 and the diffraction grating 3. Viewed from the grating, the entrance slit appears to thus be closer or farther away. The entrance slit can be virtually displaced in the beam direction by the movement of the mirror group. In this connection, virtually means: only effective in the optical image. The entrance slit is not physically actively moved.

Figure 2:
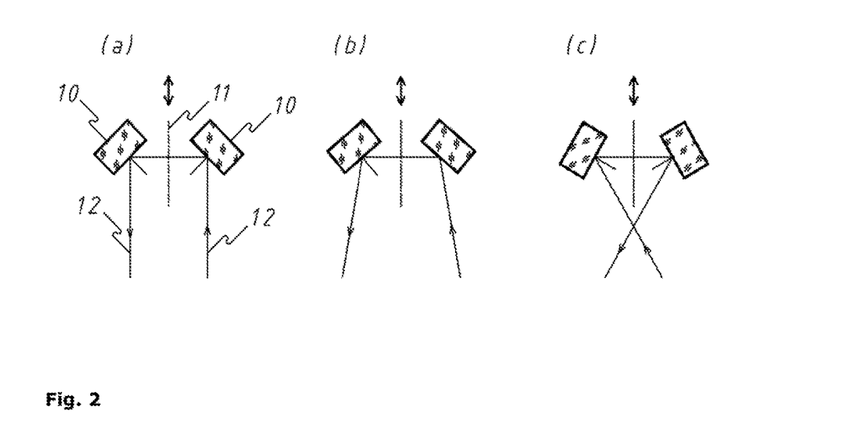
FIG. 2: shows three alternative embodiments of the mirror group.

The simplest variant of such a mirror arrangement constitutes a retroreflector, i.e. two mirrors 10 arranged at 90° to each other [FIG. 2a]. A displacement of the mirror group by Δs downwards along the symmetry axis 11 [in FIG. 3a] of course causes the path length of the beam 12 to reduce by 2 Δs. Conversely, the route of the beam extends by this amount when the displacement of the mirror group takes place in an upwards manner.

Figure 3:
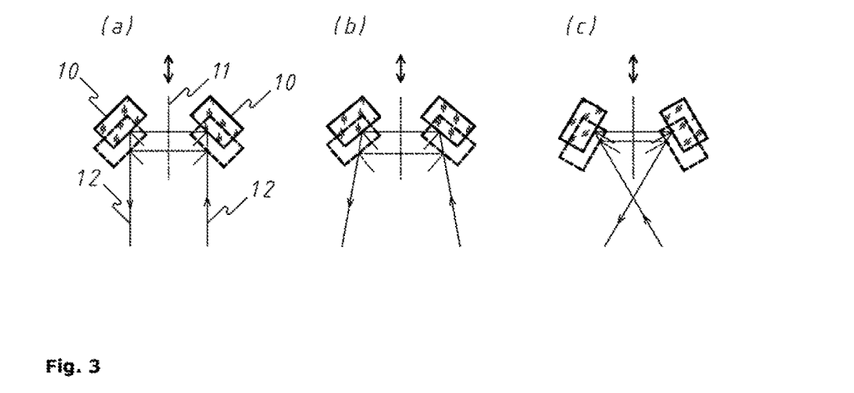
FIG. 3: shows the path changes in the case of a linear movement of the mirror groups from FIG. 2 in the direction of the symmetry axis.

The two mirrors can be arranged at a different angle to each other than 90° in order to give the reflected beam a desired direction [FIGS. 2b, 3b]. In addition, the light path within the mirror group can also be guided in a crosswise manner, as depicted in FIGS. 2c, 3c. In any case, a displacement of the mirror group along the symmetry axis thereof causes a change of the optical path length, i.e. the front focal distance of the optical image. Only the amount of the displacement, required for achieving a certain path length change, varies. What is common to all variants in FIGS. 3a, 3b, 3c is that in the case of the displacement of the mirror group along the symmetry axis thereof, the direction and the position of the reflected beam are invariant.

In order to prevent the defocussing of the spectrometer [FIG. 1] due to the thermal expansion of the optical base body 1, the mirror group 6 is displaced in a temperature-dependent manner and the back focal lengths of the optical image are adapted such that the focal curve is again at the location of the detectors 4a or exit slits 5. Since both the thermal expansion of the base body and the correction amounts of the back focal lengths are small compared to the focal length of the spectrometer, the focal curve retains the circular form thereof with sufficient accuracy.

The concept could be experimentally verified. The full width at half maximum (FWHM) of the image profile of a spectral line serves as proof of the position of the focal curve and thus the spectral resolution of the spectrometer, as is measured by a CCD array sensor at the Rowland circle.

Figure 4:
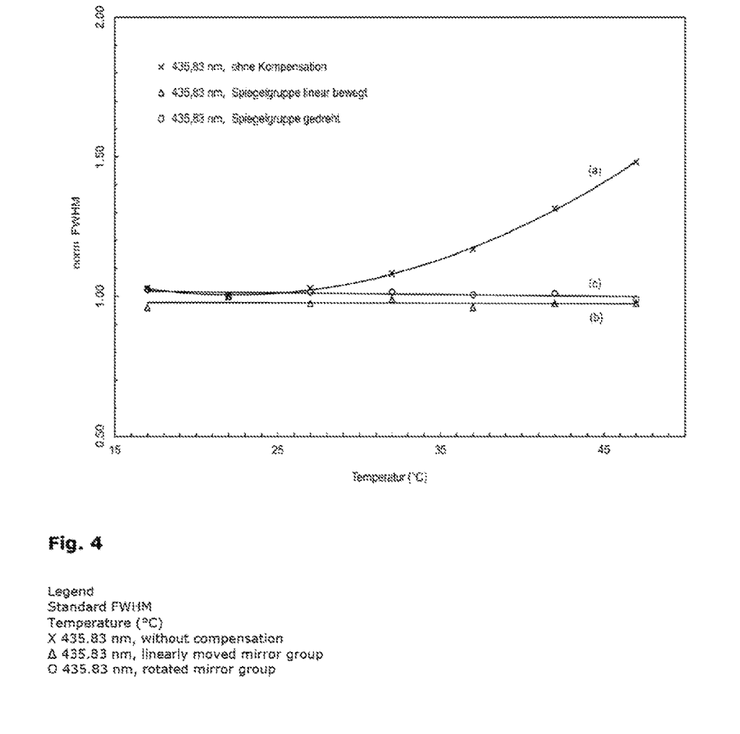
FIG. 4: shows changes of the full width at half maximum of a spectral line as a function of the temperature in the case of an uncompensated spectrometer in comparison to two different embodiments of compensated spectrometers according to the invention.

FIG. 4 shows the full width at half maximum of the spectral line Hg 435.83 nm measured over a temperature range of 17° C. to 47° C. for example in a spectrometer according to FIG. 1. The values are applied relative to the measurement value in the focus, the value 1.5 thus denotes a displacement of the full width at half maximum and thus of the spectral resolution by 50%. Curve (a) indicates the temperature profile without compensation measures, curve (b) the temperature profile with focus compensation by means of the linearly moved mirror group. The horizontal profile of the curve (b) proves the effectiveness of the focus tracking by the mirror group moved by a thermobimetal. Curve (c) was recorded with a mirror group which was rotated in a temperature-dependent manner. This curve also shows the compensation effect achieved.

Figure 8:
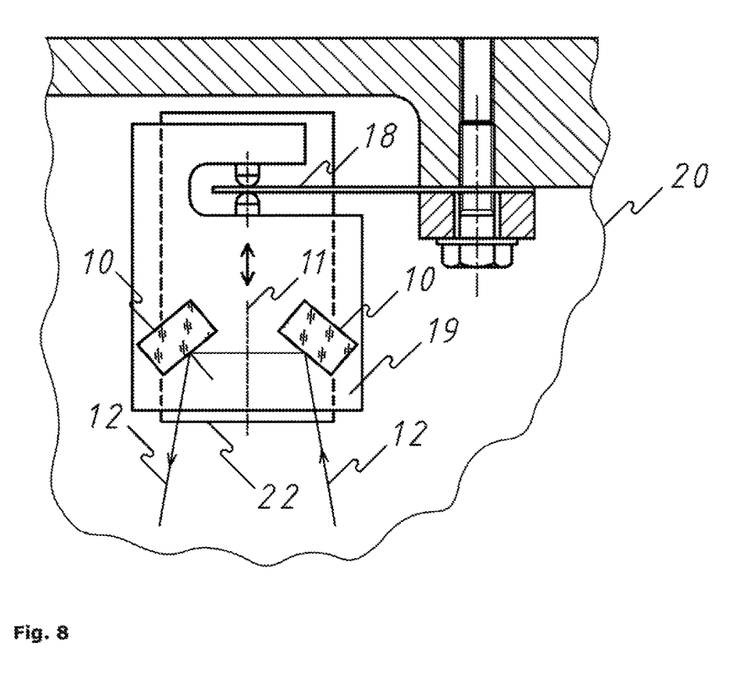
FIG. 8: shows schematic depiction of the drive of the mirror group with a thermobimetal strip.

In a preferred embodiment [FIG. 8], the linear movement of the mirror group 19, required for the optomechanical compensation of the defocussing, with respect to the optical base body 20 is implemented with the aid of a mechanically precise linear guide 22 and a thermobimetal strip 18, wherein the coupling of the thermobimetal strip 18 on the side of the mirror group 19 is designed so as to be mechanically free of play. No reverse play thereby occurs in the case of a change of direction. The other end of the thermobimetal strip 18 is fixedly connected in a heat-conducting manner to the optical base body 20. The temperature-dependent deflection of the thermobimetal required for the compensation is calculated corresponding to the requirements of the optical design.

The defocussing of the optical image due to the thermal expansion of the optical base body constitutes an intrinsic property of all spectrometers. Furthermore, a temperature-dependent drift movement of the spectrum along the focal curve can occur in some spectrometers depending on the design. This kind of maladjustment of the optical system is a collective change of the diffraction angle of all wavelengths, as occurs, for example by a slight rotational movement of the dispersion element about the axis perpendicular to the dispersion plane. This causes a slight change of the incidence angle, as a result of which the diffraction angle of all wavelengths changes with an inverted sign. A different wavelength is now measured at a specific point of the focal curve of the spectrometer. Such a temperature-related spectrum drift can similarly be compensated according to the invention by means of the linearly moved mirror group.

Figure 5:
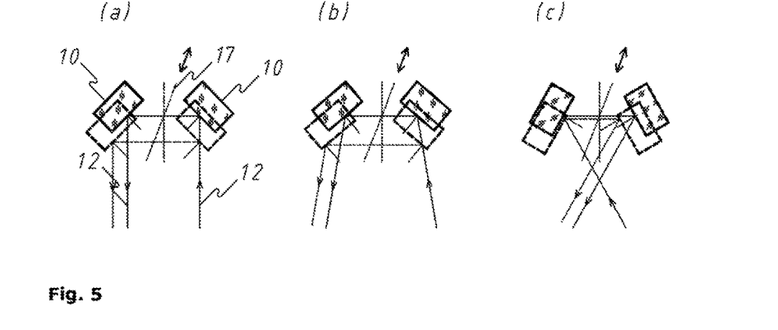
FIG. 5: shows schematic depictions similar to FIG. 3, wherein the displacement direction deviates from the symmetry axis of the mirror group.

FIG. 5a shows the situation in the case of the retroreflector [FIG. 2a] when the movement of the mirror group in the incident plane takes place linearly to an axis which does not correspond to the symmetry axis. The displacement of the mirror group along the axis 17 downwards involves, analogous to FIG. 3a, a decrease of the optical route for the beam 12. However, the beam is still also offset in parallel. The same applies according to FIGS. 5b and 5c for the variants of the mirror arrangements FIGS. 2b and 2c. In the case of rotation of the displacement axis 17 with respect to the symmetry axis in a clockwise direction, as is shown in FIG. 5, the beam offset takes place to the left. It can be understood that a rotation of the displacement axis in the clockwise direction causes a beam offset to the right. A desired pair of values of optical path length change and beam offset per travel can be set via the selection of the angle of the displacement axis to the symmetry axis.

The parallel offset of the incident beam is, in the case of the optical image, equivalent to the shifting of the object to be imaged transverse to the optical axis. In the spectrometer according to FIG. 1, a movement of the mirror group according to FIG. 5b thus causes both a virtual change of position of the entrance slit in the beam direction and a virtual change of position of the entrance slit perpendicular to the beam direction in the incident plane. The entrance slit is not displaced mechanically as before.

The virtual change of position of the entrance slit transverse to the beam direction, viewed from the diffraction grating, is synonymous with a virtual change of incidence angle, as a result of which the diffraction angles of all wavelengths change with an inverted sign. The value and sign of this virtual change of incidence angle can be set by the angle deviation of the displacement axis of the mirror group to the symmetry axis thereof.

With the mirror group moved in a temperature-dependent manner in relation to the optical base body, both the defocussing of the spectrometer in the case of temperature changes can thus be compensated and also an optionally present temperature-related collective spectrum drift, without the light entry aperture having to be mechanically moved.

Figure 6:
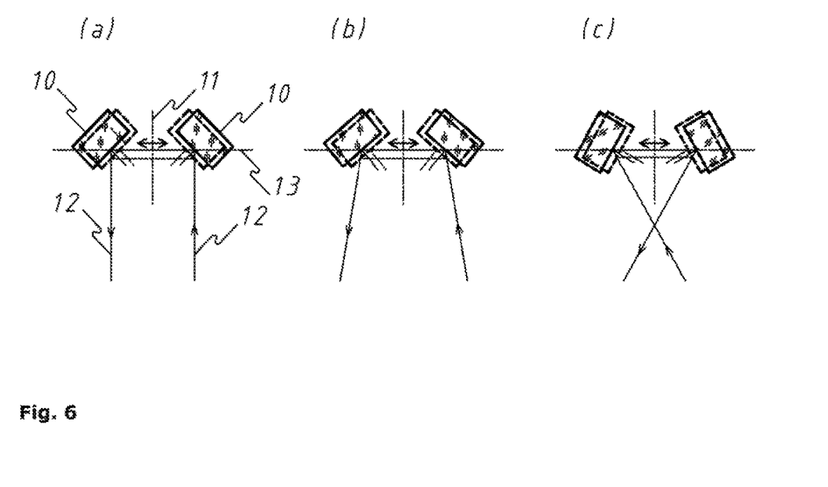
FIG. 6: shows a further possibility of causing a path length change of the beam by means of a linear movement.

FIG. 6 illustrates a further possibility of causing a path length change of the beam by means of a linear movement. Both mirrors 10 are moved individually and linearly along the axis 13 which is perpendicular to the symmetry axis 11. In this respect, the mirrors change their distance to the symmetry axis 11 in the same manner. The displacement of the mirrors towards each other is depicted, whereby the beam path 12 is shortened. FIGS. 6a, 6b, 6c show the different arrangement variants of the mirrors analogous to FIGS. 3a, 3b, 3c. Conversely, an extension of the beam path is caused when the mirrors on the axis 13 are uniformly moved away from each other.

In addition to the path length change, a parallel offset of the outgoing bean occurs when the movement of the mirrors does not take place uniformly along the axis 13, the mirrors thus cover different paths. The above-described optical compensation of the thermal effects is thus not only possible with the linear movement of the entire mirror group, but rather also with the linear movement of the individual mirrors relative to each other. The technical implementation of this solution, however, is notably more complex since two movement drives have to be implemented and thermomechanically adjusted to each other in a very precise manner. This solution approach is thus hardly relevant for practical use.

Figure 7:
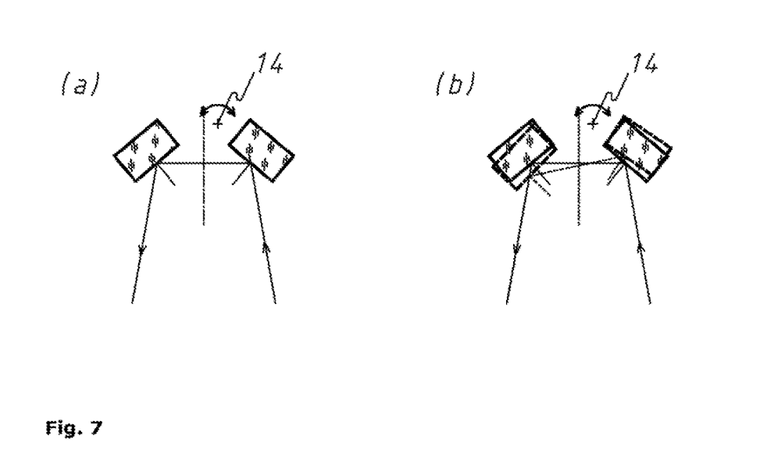
FIG. 7: shows changes of the light path in the case of a rotation of a mirror group in one example.

Instead of a linear displacement of the mirror group, a rotation of the mirror group can also be carried out about an axis perpendicular to the incident plane in order to enable a change of the optical path length and, if required, simultaneously a parallel displacement of the outgoing beam, thus to displace the light entry aperture virtually in the beam direction and transverse to the beam direction [FIGS. 7a and 7b]. The position of the rotational axis 14, about which the mirror group is rotated, determines the relation of path length change and parallel offset in the case of the rotational movement. The position of the rotational axis can thus be selected such that, in the case of the rotation of the mirror group, the desired path length change takes place, but only a very small and thus negligible parallel displacement of the beam occurs. This special case corresponds in the effect thereof to the mirror group moved linearly along the symmetry axis thereof [FIG. 3b or 3c]

The experimental verification of this assertion took place in a structure analogous to FIG. 1, wherein however, the compensation of the defocussing took place by means of a rotation of the mirror group instead of a linear displacement. The movement of the mirror group required for the optical compensation is also carried out thermomechanically in this structure by means of thermobimetal. Curve (c) in FIG. 4 shows the temperature profile of the measured full width at half maximum of the spectral line Hg 435.83 nm in the case of the focal compensation by means of the rotated mirror group. The horizontal profile of the curve (c) proves the effectiveness of the focus tracking by the mirror group rotated by a thermobimetal element.

Thus far, the effect of a moved mirror group has been explained which is located in the beam path of the spectrometer between the light entry aperture and the dispersion element. The virtual displacement of the light entry aperture caused hereby leads indirectly, by way of the laws of the optical image and of the diffraction at the dispersion grating, to the desired correction of the spatial position of the focal curve and of the spectrum generated.

It is understood that when the mirror group is located in the beam path between the dispersion element and the detector(s), the spatial position of the focal curve and of the spectrum generated can be directly corrected by the movement of the mirror group and indeed for the wavelengths, the diffracted radiation of which is captured by the mirror group. The change of the optical path length of the beam directly changes here the back focal lengths and the parallel offset of the beam directly displaces the spectrum. The mirror group in turn causes the effects of a virtually displaced light entry aperture.

Although the contexts have been explained with the example of a Paschen-Runge spectrometer, the arrangement according to the invention is not limited to this type of spectrometer, but rather is effective and applicable in all imaging spectrometer assemblies with concave or planar diffraction gratings, provided the mirror group is positioned at a point in the beam path of the optical image, at which it can exercise the above-described influences thereof on the front focal distance or the back focal distance of the imaging system. This also applies, for example for Echelle spectrometers.

The use of thermobimetal constitutes a simple, very reliable and cost-effective way of movement control. In the context of this invention, however, further possibilities of temperature-dependent compensation displacement of the mirror group are also permissible. This can thus, for example also take place by means of electrically driven adjusting units which can be controlled by recording temperature, expansion or other parameters.

The present invention makes it possible to manufacture spectrometers with optical base bodies from tried and tested conventional materials and to effectively and cost-efficiently compensate the described effects. Unlike thermostatic regulation, no electrical energy is consumed in the case of the compensation according to the invention by means of a thermomechanical drive with thermobimetal. This is a significant advantage in particular for mobile devices which are dependent on electricity supply by way of energy storage devices (accumulators, batteries etc.).

Since no mechanical movement of the entry opening is required in order to carry out the optomechanical compensation of the defocussing according to the invention by means of a mirror group, no disadvantages or limitations occur in the case of the input of the light from the radiation source. Furthermore, compensation of any collective drifts of the depicted spectrum is also still possible using the approach according to the invention.

We claim:

1. A spectrometer for examining a spectrum of an optical emission source, including:
   an optical base body,
   a light entry aperture fixedly connected to the optical base body and configured to couple light from the emission source into the spectrometer,
   at least one dispersion element arranged to receive the light as a beam of rays and to generate a spectrum, and
   at least one detector arranged to measure the generated spectrum,
   wherein a light path runs from the light entry aperture, via the at least one dispersion element, to the at least one detector,
   and wherein the spectrometer further includes:
   a mirror group with at least two mirrors provided in a section of the light path between the light entry aperture and the at least one detector, in which the beam does not run parallel, of which at least one mirror or the entire mirror group is arranged to be moveable relative to the optical base body and is coupled with a temperature-controlled drive, wherein the light path is led from the light entry aperture to the at least one detector via the mirror group, wherein the mirror group is mounted on the optical base body in a linear bearing.

2. The spectrometer according to claim 1, wherein the mirror group is provided in a first section of the light path between the light entry aperture and the dispersion element, in which the beam runs in a divergent manner.

3. The spectrometer according to claim 1, wherein the mirror group is provided in a second section of the light path between the dispersion element and the at least one detector, in which the beam runs in a convergent manner.

4. The spectrometer according to claim 1, wherein the mirror group comprises two plane mirrors, which are arranged at an angle to each other and form a reflector configured to deflect the light.

5. The spectrometer according to claim 1, wherein the mirror group comprises a symmetry axis and is linearly displaced by the temperature-controlled drive in a displacement direction in order to change an optical path length of the light path and/or to generate a parallel offset.

6. The spectrometer according, claim 1, wherein the mirror group is rotated about a rotational axis oriented at a right angle to an incident plane, defined as an initial plane of incidence of the beam with respect to the mirror group, wherein a position of the rotational axis is selected such that in the case of the rotation, both a change of length of the light path and a parallel offset of light reflected by the mirror group are achieved.

7. The spectrometer according to, claim 1, wherein the mirror group is rotated about a rotational axis oriented at a right angle to an incident plane, defined as an initial plane of incidence of the beam with respect to the mirror group, wherein a position of the rotational axis is selected such that a change of length of the light path is achieved, and such that a parallel offset of a beam reflected by the mirror group is negligibly small.

8. The spectrometer according to, claim 1, wherein the temperature-controlled drive of the mirror group comprises a thermobimetal with respect to the optical base body.

9. The spectrometer according to claim 8, wherein the thermobimetal is designed in a strip shape and is fixed with a first end in a heat-conducting manner to the optical base body.

10. The spectrometer according to claim 1, wherein the linear bearing is designed as a roller bearing.

11. A spectrometer for examining a spectrum of an optical emission source, including:
    an optical base body,
    a light entry aperture fixedly connected to the optical base body and configured to couple light from the emission source into the spectrometer,
    at least one dispersion element arranged to receive the light as a beam of rays and to generate a spectrum, and
    at least one detector arranged to measure the generated spectrum,
    wherein a light path runs from the light entry aperture, via the at least one dispersion element, to the at least one detector,
    and wherein the spectrometer further includes:
    a mirror group with at least two mirrors provided in a section of the light path between the light entry aperture and the at least one detector, in which the beam does not run parallel, of which at least one mirror or the entire mirror group is arranged to be moveable relative to the optical base body and is coupled with a temperature-controlled drive, wherein the light path is led from the light entry aperture to the at least one detector via the mirror group, wherein the mirror group comprises a symmetry axis and is linearly displaced by the temperature-controlled drive in a displacement direction in order to change an optical path length of the light path and/or to generate a parallel offset, wherein the displacement direction is aligned in an incident plane, defined as an initial plane of incidence of the beam with respect to the mirror group, in the direction of the symmetry axis.

12. A spectrometer for examining a spectrum of an optical emission source, including:
    an optical base body,
    a light entry aperture fixedly connected to the optical base body and configured to couple light from the emission source into the spectrometer,
    at least one dispersion element arranged to receive the light as a beam of rays and to generate a spectrum, and
    at least one detector arranged to measure the generated spectrum,
    wherein a light path runs from the light entry aperture, via the at least one dispersion element, to the at least one detector,
    and wherein the spectrometer further includes:
    a mirror group with at least two mirrors provided in a section of the light path between the light entry aperture and the at least one detector, in which the beam does not run parallel, of which at least one mirror or the entire mirror group is arranged to be moveable relative to the optical base body and is coupled with a temperature-controlled drive, wherein the light path is led from the light entry aperture to the at least one detector via the mirror group, wherein the temperature-controlled drive of the mirror group comprises a thermobimetal with respect to the optical base body, wherein the thermobimetal is designed in a strip shape and is fixed with a first end in a heat-conducting manner to the optical base body, and wherein the thermobimetal is mounted with a second end in a floating manner on the mirror group.

* * * * *